United States Patent [19]

Cloutier

[11] 4,344,687

[45] Aug. 17, 1982

[54] DIAPHRAGM AND SHUTTER MECHANISM

[75] Inventor: Robert P. Cloutier, Spencerport, N.Y.

[73] Assignee: Eastman Kodak Company, Rochester, N.Y.

[21] Appl. No.: 235,492

[22] Filed: Feb. 18, 1981

[51] Int. Cl.³ .............................................. G03B 9/40
[52] U.S. Cl. ......................................................... 354/246
[58] Field of Search .............................. 354/228–230, 354/226, 236, 234, 235, 246–249, 242

[56] References Cited

U.S. PATENT DOCUMENTS

| | | | |
|---|---|---|---|
| 348,301 | 8/1886 | Tisdel | 354/248 |
| 516,861 | 3/1894 | Fawcett | 354/245 |
| 591,347 | 10/1897 | Esmond | 354/248 |
| T 924,007 | 7/1974 | Couture | 354/246 |
| 2,495,224 | 1/1950 | Bodlander | 354/246 |
| 3,270,646 | 9/1966 | Wilson | 354/236 X |
| 3,479,935 | 11/1969 | Harvey | 354/246 |
| 3,913,112 | 10/1975 | Takahama | 354/246 |
| 3,946,414 | 3/1976 | Kitai | 354/246 X |
| 4,023,192 | 5/1977 | Simon-Bathmann | 354/147 |
| 4,160,588 | 7/1979 | Beach | 354/31 |

*Primary Examiner*—Donald A. Griffin
*Attorney, Agent, or Firm*—R. A. Fields

[57] ABSTRACT

In a camera, first and second blades are operable in a first mode as diaphragm and shutter blades, respectively, for effecting a first aperture-shutter speed combination and are operable in a second mode as shutter and diaphragm blades, respectively, for effecting a second aperture-shutter speed combination. A selector is movable to operate the first and second blades in either one of the two modes. The first aperture-shutter speed combination has a relatively low exposure value and the second aperture-shutter speed has a relatively high exposure value.

10 Claims, 4 Drawing Figures

DIAPHRAGM AND SHUTTER MECHANISM

BACKGROUND OF THE INVENTION

1. Field of the Invention

The present invention relates generally to photography and more particularly to a diaphragm and shutter mechanism for exposing film in a camera.

2. Description of the Prior Art

It is desirable in modern cameras to be able to choose from among a number of aperture-shutter speed combinations. One of the simpler forms of exposure control in a still camera that provides a choice of aperture-shutter speed combinations is disclosed in U.S. Pat. No. 4,160,588. In that camera, a diaphragm assembly includes two blades, each of which has a different diameter opening. The larger opening is fixed in the light path of the camera lens to control the amount of light that can pass through such lens. The blade with the smaller opening is manually slidable to locate that opening behind the larger diameter opening, which stops down the lens aperture from f5.6 to f9. A shutter assembly in the camera includes an opening blade and a closing blade, each of which has a similar size opening. The closing blade is normally located in an open or nonblocking position in which its opening is aligned with the light path of the camera lens. Conversely, the opening blade is normally located in a closed or blocking position, blocking the light path of the lens. Upon actuation of a shutter release, the opening blade is spring-urged to an open position, no longer blocking the light path and initiating an exposure interval. A timing circuit, energized in synchronization with movement of the opening blade from the closed position, causes the closing blade to be unlatched after a time period related to the level of scene light received by a photocell in the timing circuit. The unlatched blade is spring-urged to a closed position, blocking the light path of the lens and terminating the exposure interval.

Although providing several aperture-shutter speed combinations, an exposure control such as the one disclosed in U.S. Pat. No. 4,160,588 includes separate dual-blade diaphragm and shutter assemblies, which, owing to their complexity, increases the relative manufacturing cost of such an exposure control. Moreover, with the shutter assembly in this type of exposure control, the opening blade at the end of its spring-urged travel to the open position rebounds off a stop member, possibly causing camera shake during the exposure interval, which may blur the resulting image.

A simplified type of shutter assembly that uses only a single blade to uncover and cover the lens aperture, and which does not cause any camera shake during the exposure interval, is disclosed in U.S. Pat. No. 4,023,192. Upon actuation of the shutter release, the shutter blade is spring-urged continuously from an initial closed position, through an open position, to a final closed position. In this example, any camera shake caused by the shutter blade striking a stop member at the end of its travel occurs after the exposure interval is terminated. However, with this type of shutter assembly, a second or covering blade is included to prevent light from exposing film in the camera during recocking of the shutter blade to the initial closed position. Moreover, the shutter assembly is limited to a single shutter speed.

Another type of shutter assembly that uses only a single blade, but which provides several shutter speeds, is the impact or inertial shutter. This type of shutter assembly commonly employs a single pivoted blade having a circular opening. Upon actuation of the shutter release, the shutter blade is struck by a high-speed impact member and moves from a normally closed position to an open position. The time during which the shutter blade remains in the open position is varied by changing the location of an adjustable rebound stop. At the end of its travel in the open position, the shutter blade rebounds off the stop member and is spring-urged to the closed position. Such rebounding, however, may cause camera shake during the exposure interval.

SUMMARY OF THE INVENTION

The previously described problems associated with known diaphragm and shutter mechanisms are believed solved by the present invention. Specifically, the present invention is a much simplified diaphragm and shutter mechanism that provides several aperture-shutter speed combinations, has fewer component parts, can be inexpensively manufactured and assembled, and does not cause any camera shake during the exposure interval.

In keeping with the teachings of the present invention, there is provided a diaphragm and shutter mechanism comprising:

first and second apertured blades operable in a first mode as diaphragm and shutter blades, respectively, for effecting a first aperture-shutter speed combination and operable in a second mode as shutter and diaphragm blades, respectively, for effecting a second aperture-shutter speed combination; and means for operating the first and second blades selectively in the first and second modes.

According to a preferred embodiment of the present invention, the second blade is operated as the shutter blade (in the first mode) by moving continuously in a single direction to first uncover and then cover an aperture in the first blade that has been positioned in the light path of the camera lens. Conversely, the first blade is operated as the shutter blade (in the second mode) by moving continuously in the same direction to first uncover and then cover an aperture in the second blade that has been positioned in such light path. After whichever one of the first and second blades that is operated as the shutter blade re-covers the opening in the other blade, the other blade is moved in the same direction to block the light path during recocking of the two blades. The two blades are recocked at the same time to dispose either one for operation as the shutter blade and the other one for operation as the diaphragm blade.

Accordingly, with the present invention, only two blades are employed which function as the diaphragm and the shutter, respectively, and effect a plurality of aperture-shutter speed combinations without causing any camera shake during the exposure interval.

DESCRIPTION OF THE PREFERRED EMBODIMENT

A diaphragm and shutter mechanism according to the preferred embodiment is incorporated in a still camera. Because still cameras are well known, this description will be directed in particular to elements forming part of or cooperating directly with apparatus embodying the present invention. It is to be understood, however, that camera elements not shown or described may take various forms known to those skilled in the camera arts.

The term "exposure value" as used in the description of the preferred embodiment refers to a number that indicates the camera exposure necessary to get a satisfactory picture with a film material of given speed. The exposure value in effect is a measure of the actual light reaching the film, irrespective of the combination of aperture and shutter speed used (as long as the exposure value remains the same). The higher the exposure value, the less the light passed through the camera lens; or, from the point of view of setting exposures, the brighter the subject to be photographed, the higher the exposure value that must be set.

Figure 1:
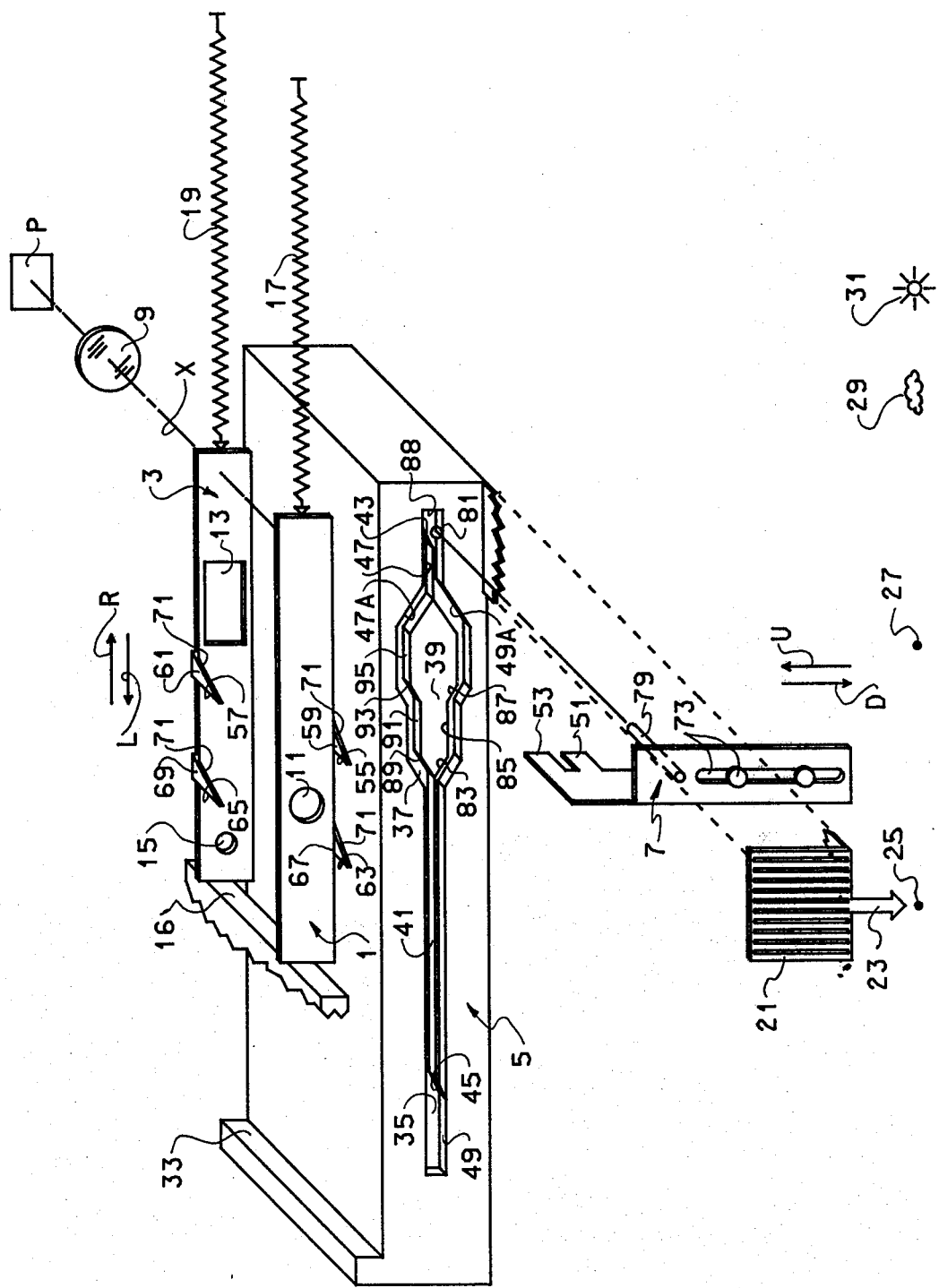
FIG. 1 is an exploded perspective view of the diaphragm and shutter mechanism in accordance with a preferred embodiment of the present invention, showing the two blades at rest.
Figure 2:
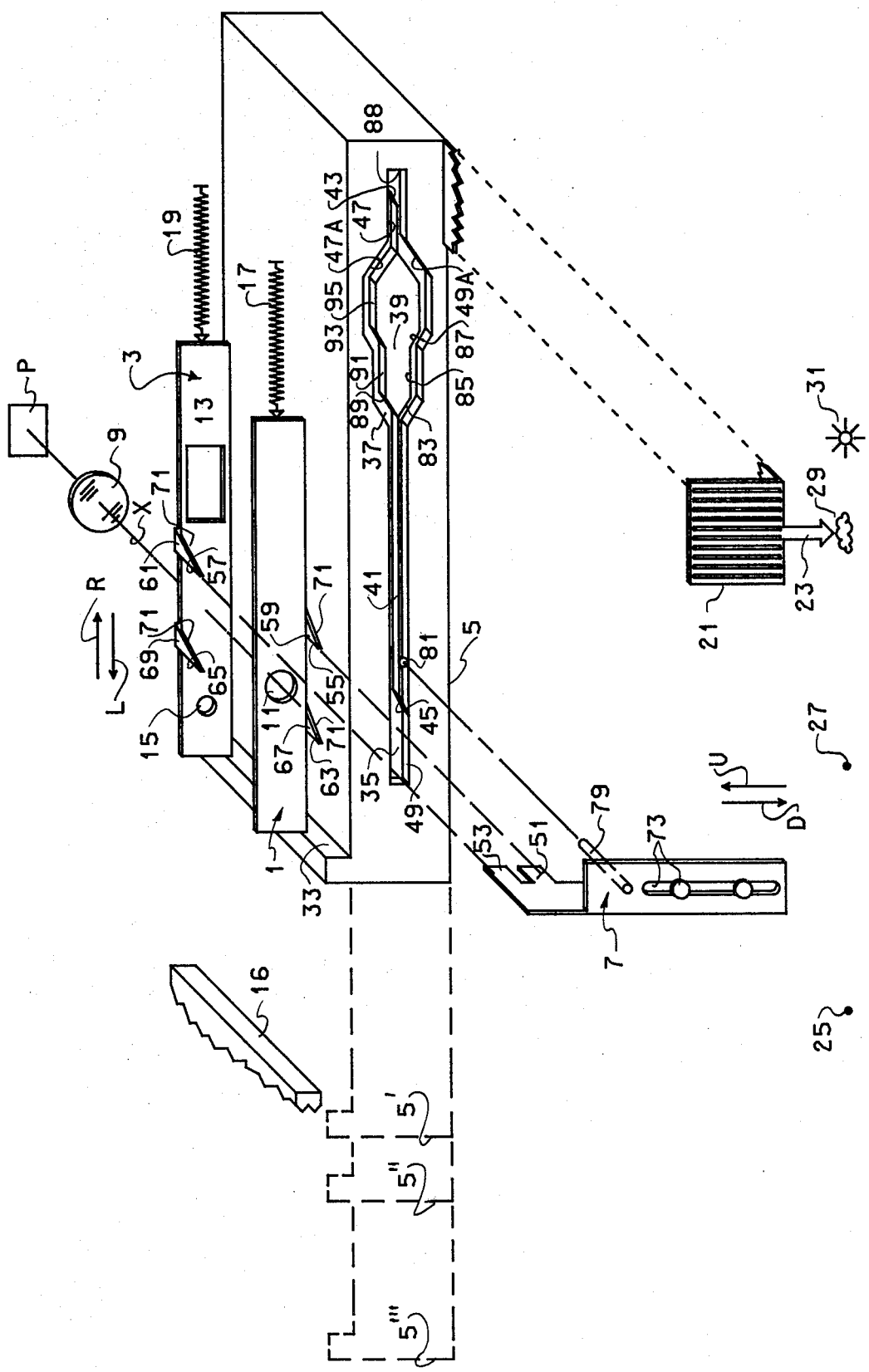
FIG. 2 is an exploded perspective view, similar to FIG. 1, though showing the two blades cocked in first positions to operate them as diaphragm and shutter blades, respectively, for effecting a first aperture-shutter speed combination having a relatively low exposure value.
Figure 3:
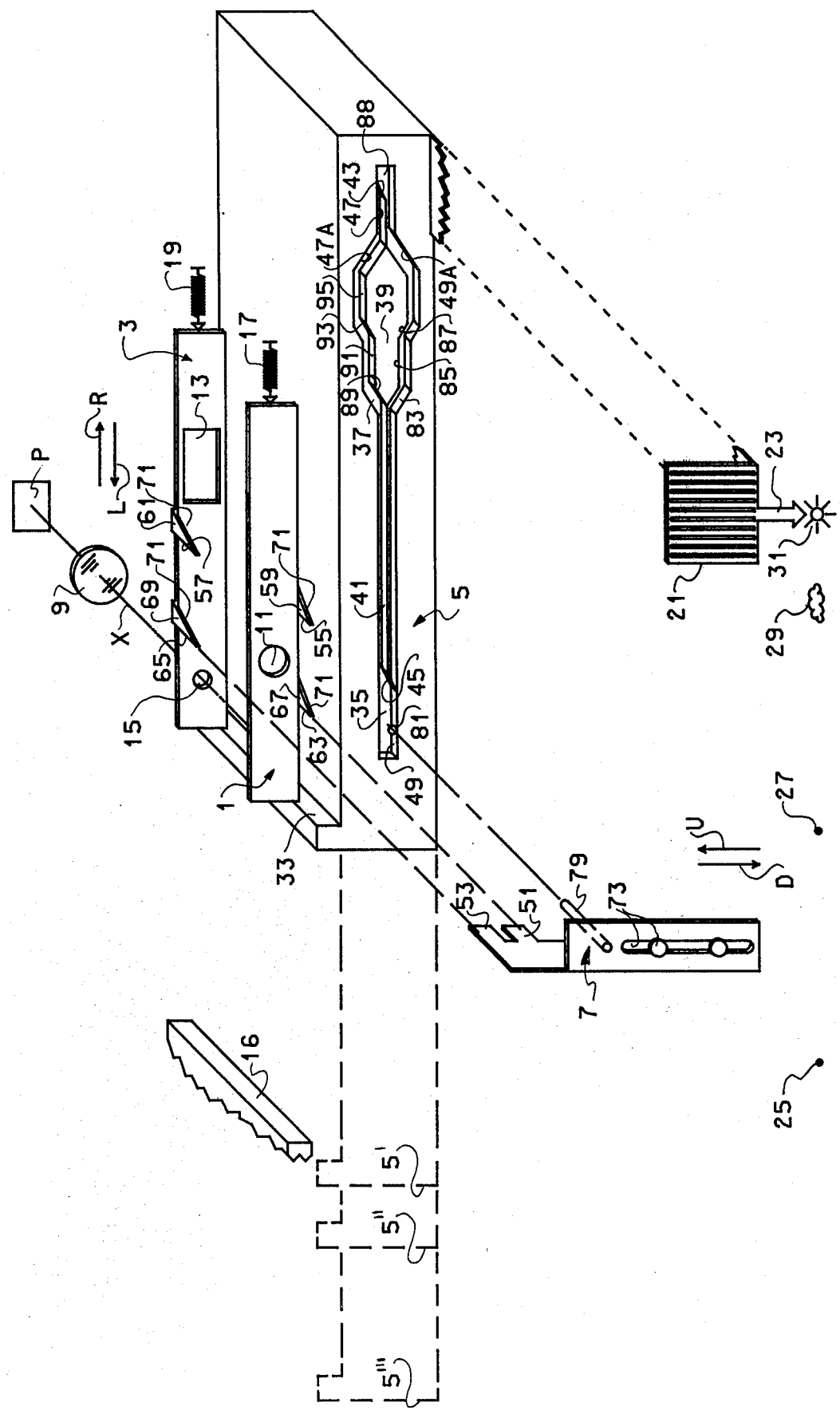
FIG. 3 is an exploded perspective view similar to FIG. 1, though showing the two blades cocked in second positions to operate them as shutter and diaphragm blades, respectively, for effecting a second aperture-shutter speed combination having a relatively high exposure value.

Referring now to FIGS. 1-3, there is shown a diaphragm and shutter mechanism for exposing film in a still camera. The mechanism is mounted within the camera housing, not shown, and comprises:

(a) first and second blades 1 and 3 operable in a first mode as diaphragm and shutter blades, respectively, for effecting a first aperture-shutter speed combination having a first exposure value, e.g., f2.8-1/125 sec., which has an EV of 10, and operable in a second mode as shutter and diaphragm blades, respectively, for effecting a second aperture-shutter speed combination having a second exposure value, e.g., f8-1/250 sec., which has an EV of 14; and (b) a manual slider 5 and a blade latch 7 for operating the first and second blades selectively in the two modes.

Appropriate known means, such as guide tracks or guide pins, not shown, support the first and second blades 1 and 3 for sliding movement (independent of one another) in opposite directions, indicated by the arrows R and L, along respective paths perpendicular to the optical axis X of a camera lens 9. The two blades are opaque to prevent light rays entering an opening in the camera housing from passing along the optical axis, through the camera lens, onto a film plane P. A circular opening 11 in the first blade 1 serves alternatively as a diaphragm stop having an f-number of f2.8 and as a shutter opening for producing a shutter speed of 1/250 sec. The second blade 3 includes a rectangular opening 13, larger than the circular opening 11, which is used as a shutter slot for producing a shutter speed of 1/125 sec., and includes a circular opening 15, smaller than the circular opening 11, which is used as a diaphragm stop having an f-number of f8. In FIG. 1, the two blades 1 and 3 are depicted in respective rest or original positions, urged against a stop member 16 by separate return (compression) springs 17 and 19. When the two blades are manually moved in the direction R from their FIG. 1 rest or original positions to respective first positions, depicted in FIG. 2, the circular opening 11 extends across the optical axis X to serve as a diaphragm stop and the rectangular opening 13 is located rightward of the optical axis to serve as a shutter slot. An opaque portion of the second blade 3 covers the circular opening 11, blocking the light path of the camera lens 9. To take a picture, the second blade 3 is moved in the direction L from its first position by the return spring 19, without moving the first blade 1; whereupon, the rectangular opening 13 momentarily scans the circular opening 11 to allow film exposure for 1/125 sec. at f2.8, i.e., at an EV of 10. When the first and second blades 1 and 3 are manually moved in the direction R from their FIG. 1 rest or original positions beyond the first positions to respective second positions, depicted in FIG. 3, the circular opening 15 extends across the optical axis X to serve as a diaphragm stop and the circular opening 11 is located rightward of the optical axis to serve as a shutter opening. An opaque portion of the first blade 1 covers the circular opening 15, blocking the light path of the camera lens 9. To take a picture, in this instance, the first blade 1 is moved in the direction L from its second position by the return spring 17, without moving the second blade 3; whereupon, the circular opening 11 momentarily scans the circular opening to allow film exposure for 1/250 sec. at f8, i.e., at an EV of 14.

Figure 4:
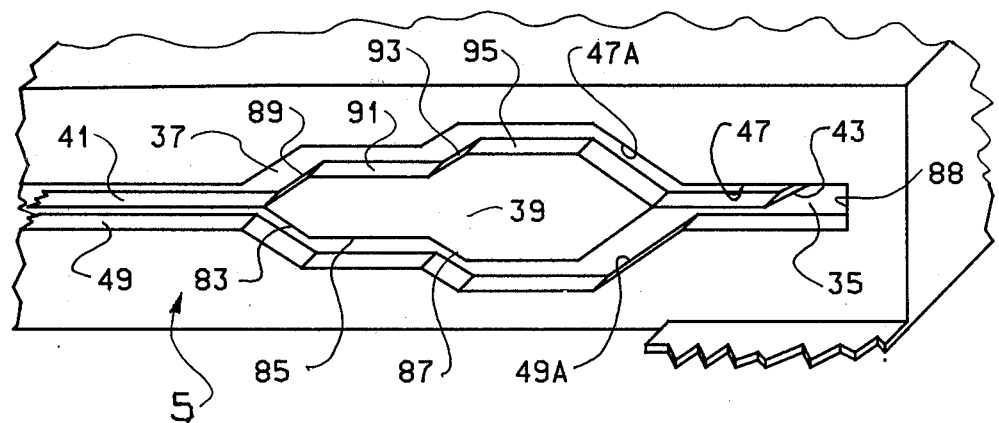
FIG. 4 is an enlargement of a portion of the mechanism illustrated in FIGS. 1-3.

The manual slider 5 includes a knurled finger grip 21 and is supported by appropriate known means, such as guide rails, not shown, for sliding movement in the same opposite directions R and L as the first and second blades 1 and 3. As the slider 5 is manually moved in the direction R in FIG. 1, a pointer 23, fixed to the finger grip 21, is sequentially aligned with various indicator means which consist of first and second dots 25 and 27, a cloud symbol 29, and a sun symbol 31, located on the outside of the camera housing. The first dot 25 indicates a starting position of the slider, depicted in FIG. 1. The second dot 27 indicates a blade pick-up position of the slider, not shown, in which a push member 33 on the slider is moved into contact with the first and second blades 1 and 3, in their rest or original positions, depicted in FIG. 1. The cloud symbol 29 indicates a first blade-setting position of the slider, depicted in FIG. 2, in which the push member 33 has moved the two blades 1 and 3 in the direction R from their rest positions to their first positions. The sun symbol 31 indicates a second blade-setting position of the slider, depicted in FIG. 3, in which the push member has moved the two blades in the direction R beyond their first positions to their second positions. A narrow channel 35 cut in the slider includes a widened portion 37 in which is located a cam island 39. Details of the cam island are best shown in FIG. 4. A spring element 41, anchored to the cam island 39, extends from opposite ends of the cam island substantially along the channel 35 and has two free ends 43 and 45 which, in FIG. 1, are turned up and turned down, respectively, to rest against upper and lower walls 47 and 49 of the channel.

The blade latch 7 includes spaced latching tabs 51 and 53 for engaging respective locking edges 55 and 57 of a right-hand pair of bent-over ears 59 and 61 on the first and second blades 1 and 3, in order to hold the two blades in their first positions against the contrary urging of the return springs 17 and 19, as in FIG. 2, and for engaging respective locking edges 63 and 65 of a left-hand pair of bent-over ears 67 and 69 on the first and second blades, in order to hold the two blades in their second positions against the contrary urging of the two springs, as in FIG. 3. When the first and second blades 1 and 3 are moved to their first or second positions by the manual slider 5, respective inclined edges 71 on either pair of ears 59 and 61 or 67 and 69 flex the latching tabs 51 and 53 out of the way to allow each pair of ears to slide by the latching tabs. Once the inclined edges 71 on a pair of ears have cleared the latching tabs, the tabs automatically straighten-out and engage the locking edges of such ears. Preferably, the latching tabs 51 and 53 are flexible enough to permit them to be displaced in one direction by the inclined edges 71, but are rigid enough to withstand the urging of the return springs 17 and 19 in an opposite direction. Alternatively, a one-way hinge having a return spring, not shown, may be provided to support the latching tabs 51 and 53 for pivoting by the inclined edges 71 and to resist the contrary urging of the return springs 17 and 19.

A pin-in-slot coupling 73 supports the blade latch 7 for sliding movement in opposite directions, indicated by the arrows D and U in FIGS. 2 and 3. A follower pin 79 on the blade latch 7 has a free end 81, disposed within the channel 35 in the manual slider 5, for cooperation with the cam island 39 to move the blade latch in the opposite directions D and U. When the manual slider 5 is initially moved in the direction L from its first blade-setting position, depicted in FIG. 2, the follower pin 79 is restrained by (and between) the spring element 41 and the channel wall 49. As the slider 5 is moved past the stop member 16 to a first blade-releasing position, depicted by a broken line 5' in FIG. 2, a cam surface 83 on the cam island 39 drives the follower pin 79 to move the blade latch 7 in the direction D, until the latch tab 53 clears the locking edge 57 of the right-hand ear 61 on the second blade 3. This releases the second blade. However, the latch tab 51 remains in engagement with the locking edge 55 of the right-hand ear 59 on the first blade 1. As a result, the return spring 19 moves the second blade 3 relative to the first blade 1 in the direction L; whereupon, the rectangular opening 13 momentarily scans the circular opening 11 to initiate a film exposure. Then, the second blade 3 re-covers the circular opening 11 to terminate the film exposure. During this time, continued movement of the slider 5 in the direction L advances a dwell surface 85 on the cam island 39 across the follower pin 79 to hold the blade latch 7 stationary. When the slider 5 is moved to a second blade-releasing position, depicted by a broken line 5" in FIG. 2, a cam surface 87 on the cam island 39 drives the follower pin 79 to further move the blade latch 7 in the direction D, until the latch tab 51 clears the locking edge 55 of the right-hand ear 59 on the first blade 1. This releases the first blade 1, which is moved by the return spring 17 in the direction L to remove the circular opening 11 from the optical axis X. When the slider 5 is moved back to its starting position, depicted by a broken line 5'" in FIG. 2, a cam section 49A on the channel wall 49 moves the blade latch 7 via the follower pin 79 in the direction U, until the latch tabs 51 and 53 are again disposed for engagement with either pair of the ears 59 and 61 or 67 and 69 on the first and second blades. As shown in FIG. 1, the follower pin 79 comes to rest adjacent a channel end 88 and the two blades 1 and 3 come to rest against the stop member 16.

Conversely, when the manual slider 5 is moved in the direction L from its second (rather than its first) blade-setting position, depicted in FIG. 3, the free end 45 of the spring element 41 slides under the follower pin 79, locating the follower pin between the spring element and the channel wall 47. As the slider 5 is moved to its first blade-releasing position, depicted by the broken line 5' in FIG. 3, a cam surface 89 on the cam island 39 drives the follower pin 79 to move the blade latch 7 in the direction U, until the latch tab 51 clears the locking edge 63 of the left-hand ear 67 on the first blade 1. This releases the first blade. However, the latch tab 53 remains in engagement with the locking edge 65 of the left-hand ear 69 on the second blade 3. As a result, the return spring 17 moves the first blade 1 relative to the second blade 3 in the direction L; whereupon, the circular opening 11 momentarily scans the circular opening 15 to initiate a film exposure. Then, the first blade 1 re-covers the circular opening 15 to terminate the film exposure. During this time, continued movement of the slider 5 in the direction L advances a dwell surface 91 on the cam island 39 across the follower pin 79. This holds the blade latch 7 stationary with the latch tab 51 out of the way of the ear 59 on the first blade 1. As the slider 5 is moved to its second blade-releasing position, depicted by a broken line 5" in FIG. 3, a cam surface 93 on the cam island 39 drives the follower pin 79 to further move the blade latch 7 in the direction U, until the latch tab 53 clears the locking edge 65 of the left-hand ear 69 on the second blade 3. This releases the second blade 3, which is moved by the return spring 19 in the direction L to remove the circular opening 15 from the optical axis X. Continued movement of the slider in the direction L, advances a dwell surface 95 on the cam island 39 across the follower pin 79. This holds the blade latch 7 stationary with the latch tab 53 out of the way of the ear 61 on the second blade 3. Then, a cam section 47A on the channel wall 47 moves the blade latch 7 via the follower pin 79 in the direction D, until the latch tabs 51 and 53 are again disposed for engagement with either pair of ears 59 and 61 or 67 and 69 on the first and second blades. When the slider 5 is moved back to its starting position, depicted by the broken line 5'" in FIG. 3, the follower pin 79 momentarily flexes the free end 43 of the spring element 41 out of its way, away from the channel wall 47, and comes to rest adjacent the channel end 88.

OPERATION

When it is desired to select the first exposure value, i.e., 10, for picture-taking, the manual slider 5 is moved in the direction R to change the location of the pointer 23 from alignment with the first dot 25, as in FIG. 1, to alignment with the cloud symbol 29, as in FIG. 2. This moves the first and second blades 1 and 3 in the direction R from their rest or original positions, depicted in FIG. 1, to their first positions, depicted in FIG. 2. To effect a film exposure and return the two blades to their rest positions, the slider 5 is returned in the direction L until the pointer 23 is again aligned with the first dot 25.

Conversely, when it is desired to select the higher exposure value, i.e., 14, for picture-taking, the manual slider 5 is moved in the direction R to change the location of the pointer 23 from alignment with the first dot 25 to alignment with the sun symbol 31, as in FIG. 3. This moves the first and second blades 1 and 3 in the direction R from their rest positions beyond their first positions to their second positions, depicted in FIG. 3.

To effect a film exposure and return the two blades to their rest positions, in this instance, the slider 5 is returned in the direction L until the pointer is again aligned with the first dot.

Although the invention has been described in detail with particular reference to a preferred embodiment, it will be understood that variations and modifications can be effected within the spirit and scope of the invention. For example, instead of moving the two blades 1 and 3 manually along straight paths, motor-driven means may be provided for moving the two blades automatically along arcuate paths, as disclosed in U.S. patent application Ser. No. 235,491, filed on Feb. 18, 1981, in the name of Robert P. Cloutier, and entitled Camera Mechanism Moreover, instead of effecting only two aperture-shutter speed combinations, the two blades may be adapted to effect a greater number of aperture-shutter speed combinations, some or all of which have different exposure values. This can be done by increasing the number of openings in the two blades.

In the preferred embodiment, the two aperture-shutter speed combinations, f2.8-1/125 sec. and f8-1/250 sec., have different exposure values, EV 10 and EV 14. Alternatively, of course, the two aperture-shutter speed combinations may be selected to provide respective depths of field or some other exposure variable.

I claim:

1. A diaphragm and shutter mechanism for exposing film in a camera, said mechanism comprising:
   first and second blade means operable in a first mode as diaphragm and shutter blades, respectively, for effecting a first aperture-shutter speed combination and operable in a second mode as shutter and diaphragm blades, respectively, for effecting a second aperture-shutter speed combination; and
   means for operating said first and second blade means selectively in the first and second modes.

2. A diaphragm and shutter mechanism as recited in claim 1, wherein said operating means includes means for moving whichever one of said first and second blade means is operated as the shutter blade continuously in a single direction to initiate and terminate an exposure.

3. A diaphragm and shutter mechanism for exposing film in a camera, said mechanism comprising:
   first and second blade means operable in first positions as diaphragm and shutter blades, respectively, for effecting a first aperture-shutter speed combination and operable in second positions as shutter and diaphragm blades, respectively, for effecting a second aperture-shutter speed combination;
   means for cocking said first and second blade means selectively to the first and second positions; and
   means for operating said first and second blade means as diaphragm and shutter blades, respectively, by moving said second blade means in a single direction substantially parallel to said first blade means and for operating said first and second blade means as shutter and diaphragm blades, respectively, by moving said first blade means in the same direction substantially parallel to said second blade means.

4. A diaphragm and shutter mechanism as recited in claim 3, wherein said cocking means includes means for moving said first and second blade means as a pair with no relative motion between them.

5. A diaphragm and shutter mechanism for exposing film in a camera, said mechanism comprising:
   first and second apertured blade means operable as diaphragm and shutter blades, respectively, for effecting a first aperture-shutter speed combination and operable as shutter and diaphragm blades, respectively, for effecting a second aperture-shutter speed combination; and
   means for operating said first and second apertured blade means as diaphragm and shutter blades, respectively, by moving said second blade means to uncover and cover an aperture in said first blade means and for operating said first and second blade means as shutter and diaphragm blades, respectively, by moving said first blade means to uncover and cover an aperture in said second blade means.

6. A diaphragm and shutter mechanism as recited in claim 5, wherein said operating means includes means for moving whichever one of said first and second blade means is operated as the shutter blade continuously in a single direction to uncover and cover an aperture in the other blade means.

7. A diaphragm and shutter mechanism for exposing film in a camera, said mechanism comprising:
   first and second blade means operable alternatively as diaphragm blades for providing different apertures and operable alternatively as shutter blades for providing different shutter speeds; and
   means for operating said first and second blade means as diaphragm and shutter blades, respectively, to effect a first aperture-shutter speed combination and for operating said first and second blade means as shutter and diaphragm blades, respectively, to effect a second aperture-shutter speed combination.

8. A diaphragm and shutter mechanism as recited in claim 7, wherein said first blade means has an exposure opening and said second blade means has two different size exposure openings, one smaller and one larger than the exposure opening in said first blade means, and wherein said operating means includes means for moving said second blade means to cause its larger opening to scan the opening in said first blade means, to effect the first aperture-shutter speed combination, and for moving said first blade means to cause its opening to scan the smaller opening in said second blade means, to effect the second aperture-shutter speed combination.

9. A diaphragm and shutter mechanism for controlling the amount of ambient light in the light path of a camera lens, said mechanism comprising:
   first and second apertured blade means operable as diaphragm and shutter blades, respectively, for effecting a first aperture-shutter speed combination and operable as shutter and diaphragm blades, respectively, for effecting a second aperture-shutter speed combination;
   means for positioning whichever one of said first and second apertured blade means is to be operated as the shutter blade to block the light path of a camera lens and for positioning the other blade means with an aperture across such light path; and
   means for operating said first and second apertured blade means as diaphragm and shutter blades, respectively, by moving said second blade means to uncover and cover an aperture in said first blade means, positioned across the light path, and for operating said first and second blade means as shutter and diaphragm blades, respectively, by moving said first blade means to uncover and cover an aperture in said second blade means, positioned across the light path.

10. A diaphragm and shutter mechanism as recited in claim 9, wherein said operating means includes blade engaging latch means movable in opposite directions to release said first and second blade means, respectively, for operation as the shutter blade.

* * * * *